United States Patent
Kramer et al.

(10) Patent No.: US 7,032,722 B2
(45) Date of Patent: Apr. 25, 2006

(54) MULTIPLE BALL SCREW ASSEMBLY WITH DIFFERING PITCH USED TO OPTIMIZE FORCE AND DISPLACEMENT OF BRAKE ACTUATOR

(75) Inventors: Dennis A. Kramer, Troy, MI (US); Frederick A. Jelley, Suttons Bay, MI (US); Joseph A. Kay, Highland, MI (US); James R. Brichta, Highland, MI (US); Dennis G. O'Reilly, Rochester Hills, MI (US); Christopher S. Keeney, Troy, MI (US); Jaeho Kwak, West Lafayette, IN (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/614,582

(22) Filed: Jul. 7, 2003

(65) Prior Publication Data
US 2005/0006187 A1    Jan. 13, 2005

(51) Int. Cl.
*F16D 55/08* (2006.01)

(52) U.S. Cl. .................................................. 188/72.8

(58) Field of Classification Search ............... 188/72.7, 188/72.8
See application file for complete search history.

(56) References Cited

U.S. PATENT DOCUMENTS

| | | | |
|---|---|---|---|
| 4,273,388 A | 6/1981 | Muller | |
| 4,392,558 A * | 7/1983 | Heibel | 188/72.7 |
| 4,442,928 A | 4/1984 | Eastman | |
| 4,602,702 A * | 7/1986 | Ohta et al. | 188/72.1 |
| 5,667,284 A | 9/1997 | Drennen et al. | |
| 5,782,323 A | 7/1998 | Mills | |
| 5,915,676 A | 6/1999 | Abiru et al. | |
| 5,992,579 A | 11/1999 | Kyrtsos | |
| 6,079,797 A | 6/2000 | Ganzel | |
| 6,240,797 B1 | 6/2001 | Morishima et al. | |
| 6,264,011 B1 * | 7/2001 | Zernickel | 188/72.8 |
| 6,536,561 B1 * | 3/2003 | Keller | 188/71.8 |
| 2003/0029681 A1 * | 2/2003 | Severinsson | 188/72.8 |

FOREIGN PATENT DOCUMENTS

JP                 07144636 A   *   6/1995

* cited by examiner

*Primary Examiner*—Thomas Williams
(74) *Attorney, Agent, or Firm*—Carlson, Gaskey & Olds

(57) ABSTRACT

A brake assembly has a caliper with a first brake pad and a second brake pad. The first brake pad is moveable relative to the caliper. A brake actuator moves the first brake pad and has a first threaded member and a second threaded member. The first threaded member has first thread characteristics for moving the brake actuator at a first speed and a first force. The second threaded member has a second thread characteristics for moving the brake actuator at a second speed and a second force. The first speed is greater than the second speed while the first force is lower than the second force.

3 Claims, 2 Drawing Sheets

MULTIPLE BALL SCREW ASSEMBLY WITH DIFFERING PITCH USED TO OPTIMIZE FORCE AND DISPLACEMENT OF BRAKE ACTUATOR

BACKGROUND OF THE INVENTION

This invention relates to a brake assembly for a motor vehicle.

One type of brake system for a vehicle has a rotor that rotates with a wheel of the vehicle. To brake the vehicle, brake pads are applied to each side of the rotor, thereby creating friction to slow movement of the rotor. The brake pads are moved into contact with the rotor by a brake actuator driven by a heavy hydraulic or pneumatic cylinder. The cylinder itself requires lines, connectors and other components that significantly add to the overall weight and cost of such a brake system. While such a system can apply strong braking forces quickly to the rotor, the system is heavy and expensive to produce.

Recently, manufacturers have sought to develop electrical braking systems that brake the vehicle through electrical motors linked to the brake pads. Such systems eliminate the need for the hydraulic or pneumatic cylinder, lines, connectors and related components of traditional systems. Electric braking systems also permit greater control over braking because they may be easily linked with computer controllers. However, the forces necessary to slow a vehicle are large, particularly for commercial vehicles. As a consequence, a high torque output electric motor is generally required for these systems.

High torque output electric motors are expensive and consume a large amount of electricity from the vehicle's electrical system. Moreover, while high torque electric motors provide sufficient braking force, they are generally slow turning motors. A slow turning motor may cause an undesirable delay in brake actuation.

A need therefore exists for an improved brake assembly and method that provides the benefits of an electric braking system without the excessive expense, energy consumption, or delay associated with a high torque electric motor.

SUMMARY OF THE INVENTION

The inventive electric motor brake assembly has a unique brake actuator that operates at two different speeds and two different forces to apply a brake pad to a rotor. The brake assembly moves the brake pad at a high speed and a low clamping force so that the brake pad may be placed in close proximity to the rotor quickly and without consuming large amounts of energy. Once the brake pad engages the rotor, the brake assembly then applies the brake pad at a lower speed and higher clamping force to permit the stronger braking forces to be applied when needed. In this way, the brake assembly quickly and efficiently applies braking forces for an electric braking system to slow a vehicle.

The brake pad may have two drive mechanisms, which may be threaded rods. A first rod moves the brake pad at a high speed and at a low force. A second rod mechanism moves the brake pad at a low speed and with a high force. One threaded rod may be different from the other to permit the two drive mechanisms to operate at the two different speeds and two different forces. For example, the first rod may have a greater thread pitch than the second rod. Because of these differing thread pitches, the first rod will move at a faster speed and provide a lower clamping force than the second rod.

In addition, the first rod may operate prior to the second rod so that the brake is driven toward the rotor at the high speed and low force before the second rod begins operation. In this way, the brake assembly may position the brake pads near the rotor quickly before application of the high force from the slow second rod. The two drive mechanisms may be operated sequentially relative to each other.

A particular brake assembly of the invention comprises a caliper with a first brake pad and a second brake pad. The first brake pad moves relative to the caliper. A brake actuator moves the first brake pad at the two differing speeds and provides two differing clamping forces. The brake actuator comprises a first threaded rod and a second threaded rod. The first threaded rod has a first thread characteristic for moving the brake actuator at a first speed and providing a first clamping force. The second threaded rod has a second thread characteristic for moving the brake actuator at a second speed and providing a second clamping force.

The caliper may have a hole to receive the first threaded member. In addition, the first threaded rod may also have a hole to receive the second threaded rod so that the rods are coaxial. A common electric motor may drive the threaded rods. The motor may be coupled to the inner second rod.

The first rod may be coupled to move axially with the second rod through the friction forces between the rods. At a particular point, the second rod may be decoupled from axial movement with the first rod by overrunning the front rod so that the second rod may move independently of the first rod. This point may be when the brake actuator encounters a particular level of frictional load resistance such as when the brake actuator initially applies the brake pad to the brake rotor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
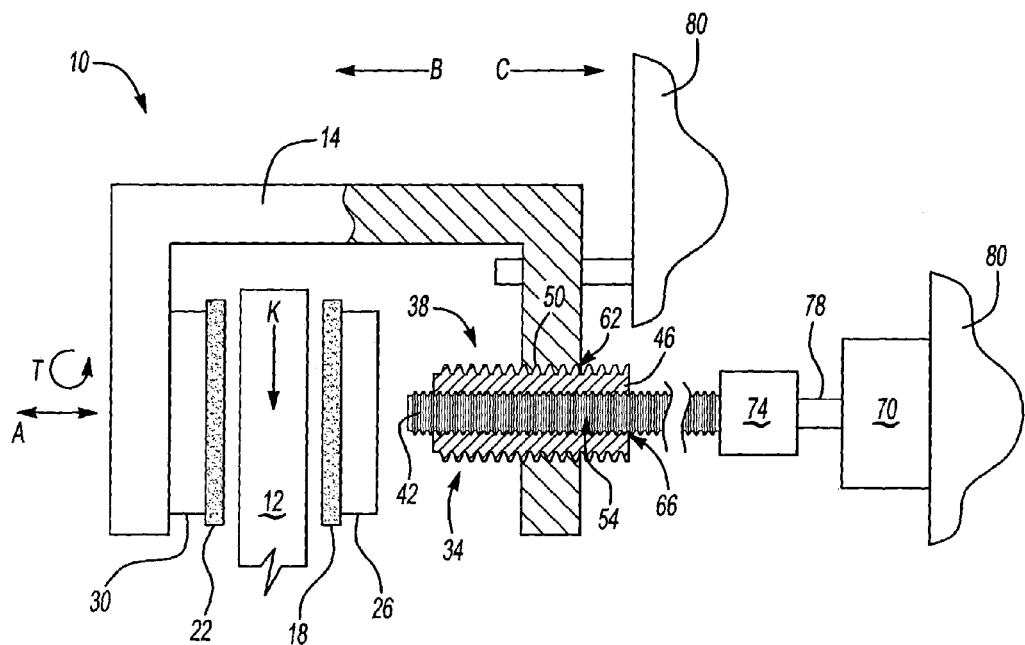
FIG. 1 illustrates a side view of the inventive brake assembly.

FIG. 1 illustrates a side view of inventive brake assembly 10 mounted to vehicle body 80. Brake assembly 10 comprises caliper 14 supported to vehicle body 80. Caliper 14 may be a sliding caliper, as is known in the art. Caliper 14 has spaced apart first 18 and second 22 brake pads. First brake pad 18 and second brake pad 22 are each mounted on first backing plate 26 and second backing plate 30. Second brake pad 22 and second backing plate 30 are fixed and mounted to caliper 14. First brake pad 18 and first backing plate 26 are supported, as known, to move relative to caliper 14. These particular features of brake assembly 10 are well known in the art. One of ordinary skill in the art will appreciate that this invention may be used with other brake configurations.

In contrast to conventional braking systems, brake assembly 10 is operatively connected to electric motor 70, which itself is mounted to caliper 50. Electric motor 70 provides the necessary braking forces to apply first brake pad 18 to rotor 12, clamping the first brake pad 18 and the second brake pad 22 about the rotor 12.

Moreover, unlike existing electric brake systems, brake assembly 10 has two drive mechanisms, first drive mechanism 38 and second drive mechanism 42. As explained further below, first drive mechanism 38 moves brake actuator 34 in the direction of arrow B moving first brake pad 18 at a relatively high speed and with a relatively low force while second drive mechanism 42 moves brake actuator 34 at a relatively low speed but with a relatively high force. In this way, brake actuator 34 may quickly place brake pad 18 into contact with rotor 12 and then apply greater clamping forces when first brake pad 18 is in contact with rotor 12. Thus, brake assembly 10 has two modes of actuation: a first actuation mode moves brake actuator 34 at a high speed and with a low force while the second actuation mode moves brake actuator 34 at a low speed but with a high force. Both first drive mechanism 38 and second drive mechanism 42 may be driven by a single electric motor 70 to achieve both brake actuation modes.

Figure 2:
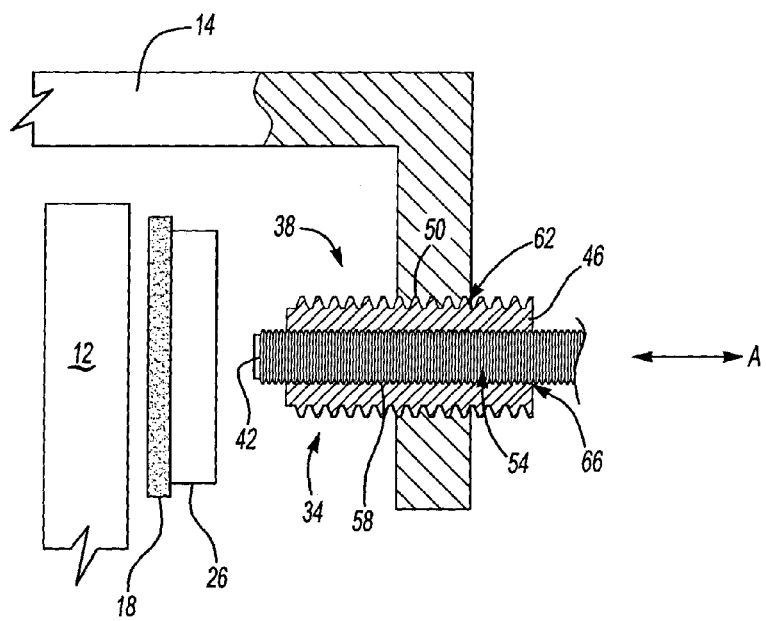
FIG. 2 illustrates the inventive brake assembly of FIG. 1, highlighting first drive mechanism, second drive mechanism and brake pad.

As shown in FIG. 1 and FIG. 2, first drive mechanism 38 comprises first threaded member 46 having first thread characteristic 50, here a coarse thread pitch. Second drive mechanism 42 comprises second threaded member 54 with second thread characteristic 58, here a fine thread pitch. First threaded member 46 and second threaded member 54 may comprise ball or roller screws. The thread pitch of first threaded member 46 is greater than the thread pitch of second threaded member 54. This differing pitch allows brake actuator 34 to have two differing output speeds and output forces with single electric motor 70.

As shown in FIG. 1, electric motor 70 has rotor 78, which itself connects to connector 74. Connector 74 rotates with rotor 78. Connector 74 is connected to rotate second threaded member 54 about axis A in a direction designated by arrow T in FIG. 1, say counterclockwise. Connector 74 permits movement of second threaded member 54 along axis A in the direction of arrow B or C.

Second threaded member 54 is received within second threaded hole 66 of first threaded member 46. Like second threaded member 54, second threaded hole 66 has fine pitch threads so that the threads of second threaded member 54 are rotatably received by the threads of second threaded hole 66.

In addition, first threaded member 46 also has threads having first thread characteristic 50, threads of a coarse pitch. First threaded member 50 is received by first threaded hole 62 of caliper 14. First threaded hole 62 has coarse threads to receive the threads of first threaded member 46. Together, first threaded member 46 and second threaded member 54 combine to form brake actuator 34.

Figure 3:
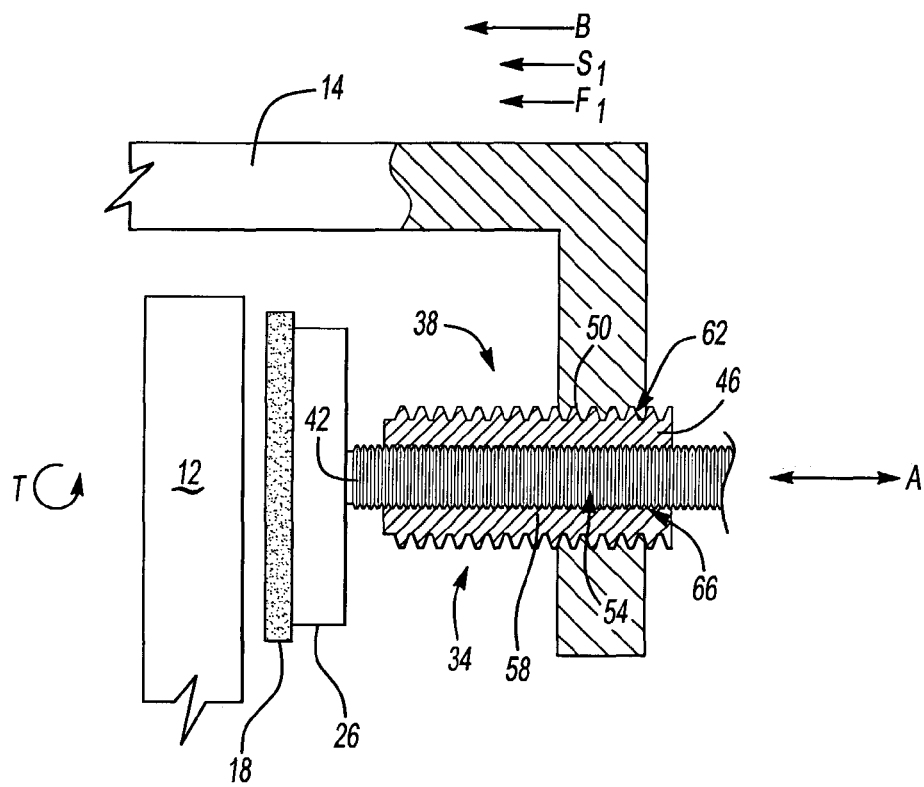
FIG. 3 illustrates the inventive brake assembly of FIGS. 1 and 2 during brake actuation at a first speed and a first force.

FIG. 2 shows brake accuator 34 spaced from first backing plate 26, which mounts first brake pad 18. as shown, brake pad 18 is normally spaced away from rotor 12 prior to braking. Upon brake actuation, as illustrated in FIG. 3, brake actuator 34 moves into a position of contact with first mounting plate 26 at first speed S1 and first force F1 in the direction of arrow B towards rotor 12. Electric motor 70 rotates rotor 78 and connector 74 in the direction indicated by arrow T. Connector 74 rotationally drives second threaded member 54 along axis A. Because of differing thread characteristics, such as the second threaded member 54 having fine threads while first threaded member 46 has coarse threads and preload is greater on threads of second member, friction between second threaded member 54 and second threaded hole 66 will be greater than friction between first threaded member 46 and first threaded hole 62. Thread characteristics, such as overall thread length or thread geometry may also be used to obtain a desired friction. Furthermore, the amount of friction may be adjusted by a coating or other known techniques. Consequently, when second threaded member 54 rotates in the direction of arrow T around axis A, second threaded member 54 will rotate first threaded member 46 until the frictional load resistance between second threaded member 54 and second threaded hole 66 is overcome.

Figure 4:
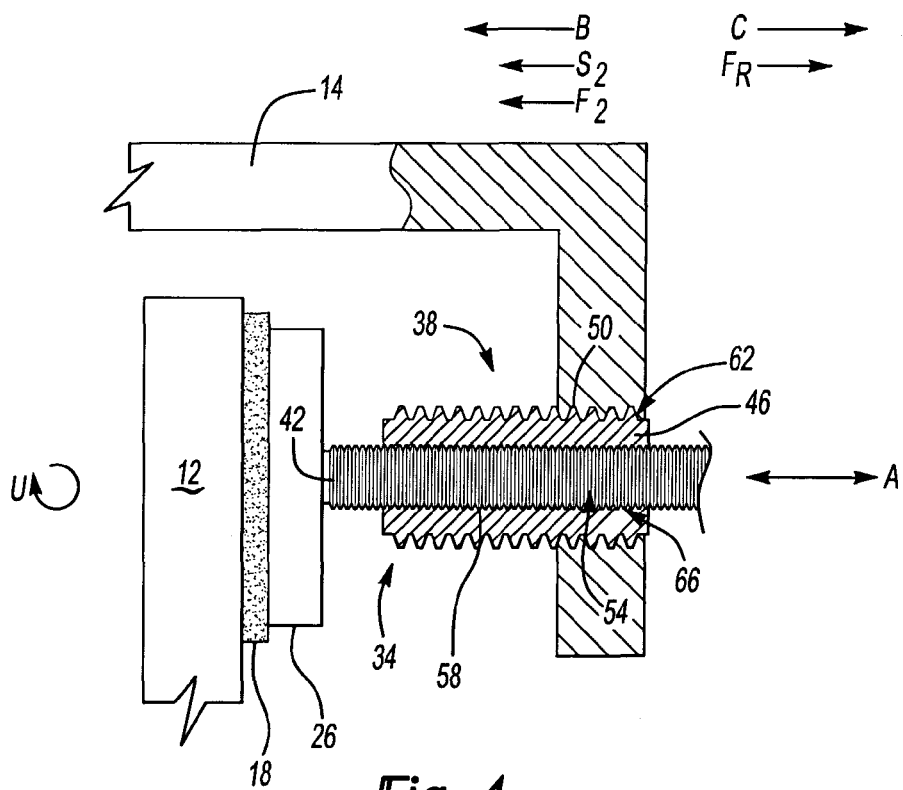
FIG. 4 illustrates the inventive brake assembly of FIGS. 1–3, showing brake actuation at a second speed and a second force.

Because second threaded member 54 rotates first threaded member 46, i.e., second threaded member 54 initially moves together with first threaded member 46, first threaded member 46 rotates within first hole 62. The coarse pitch of first threaded member 46 causes first threaded member 46 and second threaded member 54 to move in the direction of arrow B at a high speed but with low force. Brake actuator 34 will thus move at this speed and with this force until first brake pad 18 contacts rotor 12 as shown in FIG. 4.

At this instant, rotation of first threaded member 46 and second threaded member 54 encounters reaction force $F_R$ from application of the brake actuator 34 to first brake pad 18 to rotor 12. This reaction force will be in the direction of arrow C and will cause first threaded member 46 with coarse pitch threads to wedge momentarily against the coarse pitch threads of first threaded hole 62 of caliper 14. As shown in FIGS. 1 and 4, caliper 14 will move in the direction of arrow C at least initially until second brake pad 22 is in contact with rotor 12. When first brake pad 18 and second brake pad 22 are in contact with rotor 12, reaction force $F_R$ in the direction of arrow C will increase so as to wedge first threaded member 46 within first threaded hole 62. Rotational friction between first threaded member 46 and first threaded hole 62 will increase. At this point, second threaded member 54 continues to rotate within second threaded hole 66 at a slower speed but with greater force because the rotational frictional resistance between second threaded member 54 and second threaded hole 66 will be overcome by the reaction force $F_R$ of the coarse threads of first threaded hole 62 on first threaded member 46. Thus, second threaded member 54 will continue to rotate even though first threaded member 46 is prevented from rotation by reaction force $F_R$. Thus, brake actuator 34 will continue to drive first brake pad 18 and second brake pad 22 towards rotor 12 at a slower speed but with a greater clamping force.

When braking of rotor 12 is no longer desired, second threaded member 54 is rotated in the direction opposite to arrow T, as indicated by arrow U, withdrawing second threaded member 54 in the direction of arrow C from first brake pad 18 and rotor 12. At a certain point in the withdrawal of brake actuator 34 from first mounting plate 26, first threaded member 46 will experience very little reaction force and $F_R$ will decrease. As a consequence, first threaded member 46 with coarse pitch threads will be free to rotate within first threaded hole 62 to allow quick withdrawal of brake actuator 34 to the original position of brake actuator as shown in FIG. 1. Again, second threaded member 54 and first threaded member 46 will move rotationally and linearly together due to friction between second threaded member 54 and second threaded hole 66.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A brake assembly comprising:
   a caliper having a first brake pad and a second brake pad, said first brake pad movable relative to said caliper;
   a brake actuator in communication with said first brake pad, said brake actuator comprising a first threaded member rotatable about a first axis and a second threaded member rotatable about a second axis;
   said first threaded member having a first thread characteristic for moving said brake actuator at a first linear speed and a first force;
   said second threaded member having a second thread characteristic for moving said brake actuator at a second linear speed and a second force;
   wherein said first thread characteristic comprises a first thread pitch and said second thread characteristic comprises a second thread pitch, said first thread pitch being greater than said second thread pitch;
   wherein said caliper has a first hole having threads of about said first thread pitch, said first hole rotatably receiving said first threaded member; and
   wherein said first linear speed is greater than said second linear speed and said first force is lower than said second force, and wherein said first threaded member has a second hole having threads of about said second thread pitch, said second hole rotatably receiving said second threaded member.

2. A brake assembly, comprising:
   a brake;
   a brake actuator in communication with said brake;
   a first drive mechanism for driving said brake actuator, said first drive mechanism having a first linear speed and a first force; and
   a second drive mechanism for driving said brake actuator, said second drive mechanism having a second linear speed and a second force wherein said first linear speed is faster than said second linear speed and said first force is lower than said second force;
   wherein said first drive mechanism comprises a first threaded member having a first thread characteristic and said second drive mechanism comprises a second threaded member having a second thread characteristic, said first thread characteristic different from said second thread characteristic;
   wherein said first thread characteristic comprises a first thread pitch and said second thread characteristic comprises a second thread pitch, said first thread pitch greater than said second thread pitch; and
   a first threaded body having a first hole with threads of about said first thread pitch and a second threaded body having a second hole with threads of about said second thread pitch, said first hole rotatably receiving said first threaded member and said second hole rotatably receiving said second threaded member wherein said second threaded body is said first threaded member.

3. The brake assembly of claim 2 wherein a first rotational friction level exists between said first threaded member and said first threaded body and a second rotational friction level exists between said second threaded member and said second threaded body, said first rotational friction level initially being less than said second rotational friction level.

* * * * *